United States Patent [19]
Gilarski, Jr.

[11] 3,839,882
[45] Oct. 8, 1974

[54] SPEEDOMETER CABLE NOISE ABSORPTION MEMBER
[75] Inventor: Casimir Gilarski, Jr., Hamtramck, Mich.
[73] Assignee: Chrysler Corporation, Highland Park, Mich.
[22] Filed: May 4, 1973
[21] Appl. No.: 356,244

[52] U.S. Cl............ 64/4, 64/1 R, 64/11 R, 64/3
[51] Int. Cl................................ F16c 1/06
[58] Field of Search............ 64/4, 3, 2 P, 2 R, 1 V, 64/27 NM, 11 R

[56] References Cited
UNITED STATES PATENTS
2,716,873  9/1955  Byers................ 64/27 NM
2,781,436  2/1957  Barden..................... 64/4
3,602,009  8/1971  Powell..................... 64/4

FOREIGN PATENTS OR APPLICATIONS
1,294,854  4/1962  France..................... 64/3

Primary Examiner—Benjamin W. Wyche
Assistant Examiner—Randall Heald
Attorney, Agent, or Firm—Talburtt & Baldwin

[57] ABSTRACT

A noise absorbing member is positioned at the speedometer end of the speedometer cable extending from the transmission for absorbing noise vibrations due to the mechanical coupling between the cable and the speedometer. In addition, the noise absorbing member axially aligns the cable and the driven members of the speedometer providing a smoother responding speedometer indicator dial absent flutter.

5 Claims, 8 Drawing Figures

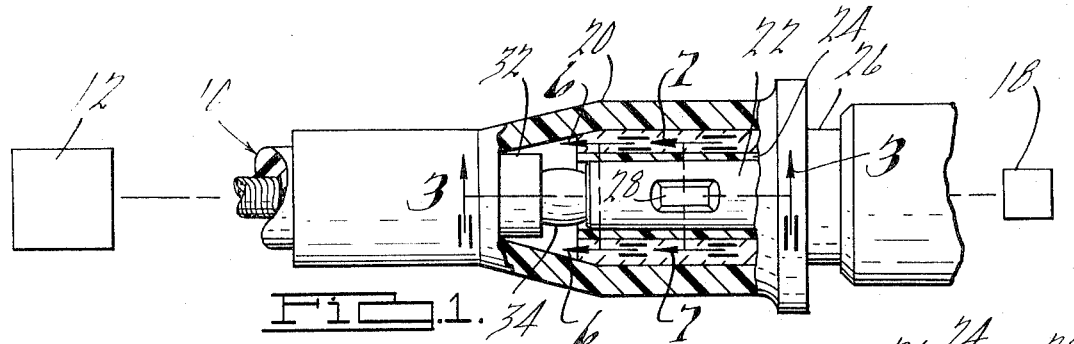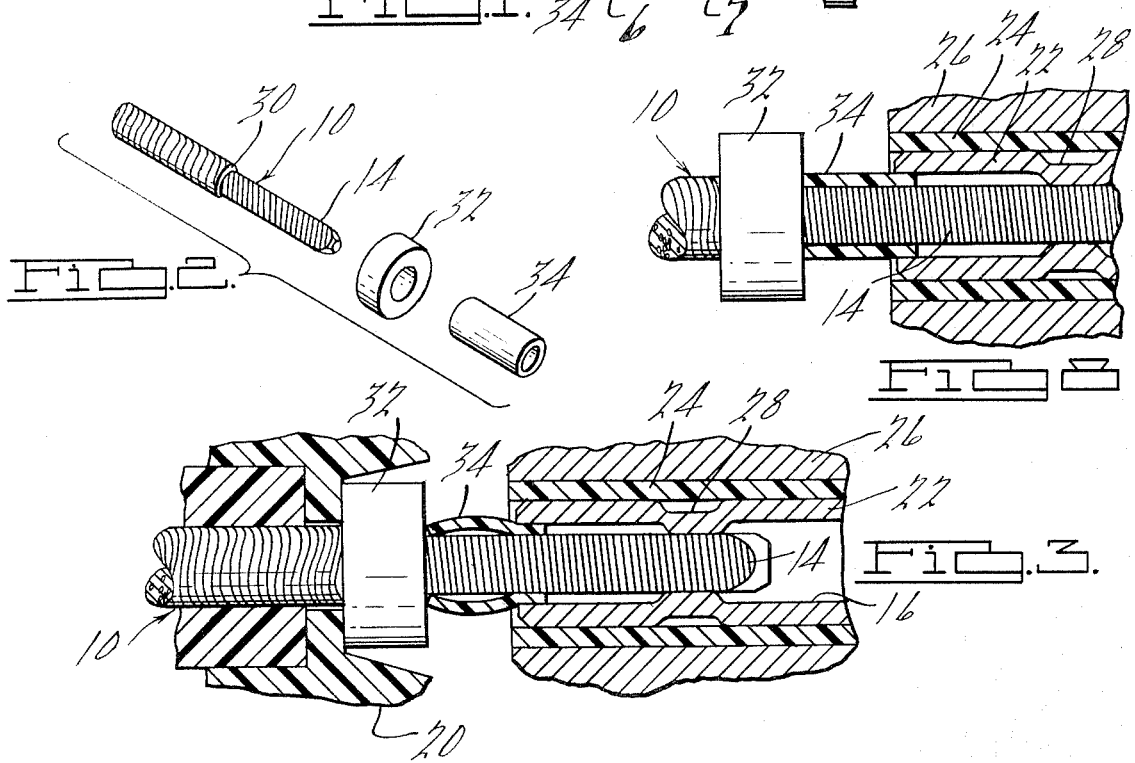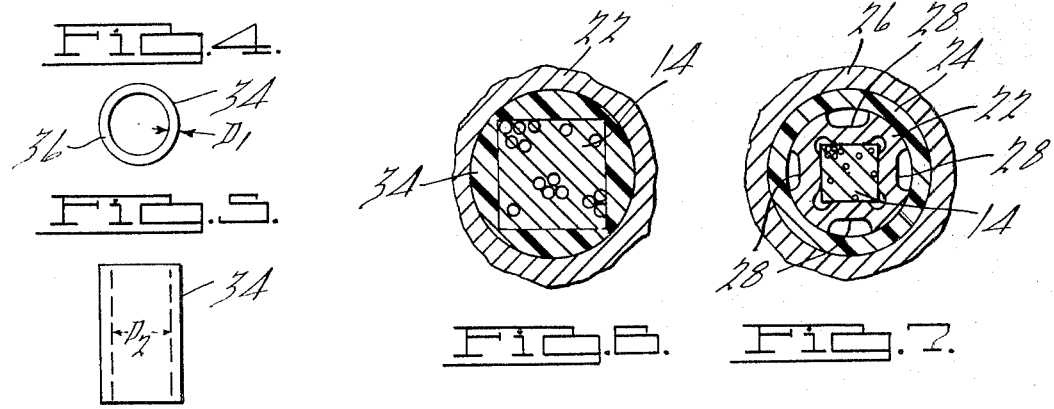

SPEEDOMETER CABLE NOISE ABSORPTION MEMBER

BACKGROUND OF INVENTION

Field of Invention

This invention relates to speedometer cables in general and in particular to improvements in the connection of the cable to the speedometer unit.

SUMMARY OF INVENTION

It is a principal object of the invention to absorb the vibrations generated along a speedometer cable from reaching the speedometer frame and radiating outward as sound to the occupants of the vehicle.

It is another object of the invention to improve the axial alignment of the speedometer cable with the rotatable magnet shaft in a speedometer thereby providing a smoother operation to the speedometer indicator.

It is still another object of the invention to more rigidly form the connection between the speedometer cable and the speedometer without requiring excessively low tolerances on the mating members.

It is yet another object of the invention to provide field installation of sound absorption means to existing speedometer without excessive cost and repair time.

These and other objects will become apparent from the following detailed description and claims of an improvement in a motor vehicle speedometer drive arrangement having a substantially round flexible drive shaft connected at one end to the vehicle transmission and at the other end to the speedometer. The end of the cable connected to the speedometer typically has a rectangular cross section for coupling within a rectangular recess in the speedometer. A sound absorbing member is positioned over the rectangular cross section and functions to dampen or absorb any vibrations being transmitted along the cable. In addition, the normal loose connection between the cable and the speedometer due to manufacturing tolerances is made more rigid due to the deformable characteristics of the sound absorbing member.

DESCRIPTION OF DRAWINGS

In the drawings,

FIG. 1 is an elevation view partly in section of the coupling of the speedometer cable to the speedometer frame;

FIG. 2 is an exploded perspective view of the core tip assembly of the speedometer shaft;

FIG. 3 is a fragmentary sectional view taken along line 3—3 of FIG. 1 illustrating utilization of the noise absorbing member of the present invention;

FIG. 4 is a plan view of the noise absorbing member;

FIG. 5 is an elevation view of the noise absorbing member;

FIG. 6 is a sectional view taken along line 6—6 of FIG. 1;

FIG. 7 is a sectional view taken along line 7—7 of FIG. 1;

FIG. 8 is a sectional view similar to FIG. 3 illustrating a modification in the assembly.

DETAILED DESCRIPTION

Referring to the figures by the characters of reference, there is illustrated in FIG. 1 an elevation view of the drive cable coupling to a motor vehicle speedometer. The drive cable or flexible shaft 10 normally having a round cross section, is connected at one end to a drive such as a vehicle transmission 12. In response to the rotational speed of the transmission, the flexible shaft is caused to rotate. The other end or core tip 14 of the shaft is coupled within a driving recess 16 of a driven member or the speedometer 18, which may be of the type shown in U.S. Pat. No. 3,517,561 of common ownership herewith. Thus, as is well known in the art, the rotational speed of the flexible shaft is proportional to the speed of the vehicle and is registered on a dial in the speedometer 18.

As illustrated in FIG. 1, the flexible shaft 10 is retained in its driving condition with a speedometer by means of a drive cable assembly connector or ferrule 20 such as that described and claimed in U.S. Pat. No. 3,234,757 which is assigned to a common assignee. The core tip end 14 of the flexible shaft as illustrated in FIG. 2 is formed into a substantially rectangular cross-sectional area providing four suitable driving surfaces.

The core tip 14 is received in the driving recess 16 which is a bore of a magnet shaft 22 journalled 24 in a cylindrical extension 26 of the speedometer frame shown in the aforementioned U.S. Pat. No. 3,517,561. Intermediate the ends of the bore 16 there is formed a rectangular driving recess 28 for engaging with the driving surfaces of the core tip 14 causing the shaft 22 to rotate with the flexible shaft 10. Encircling the core tip and at the junction 30 of the core tip, and the round shaft portion of the drive shaft 10 there is secured to the shaft a thrust collar 32. The collar functions to retain the flexible shaft 10 in the ferrule 20 against thrust forces developed in the speedometer. As illustrated in FIG. 1, the thrust collar 32 prevents the shaft 10 from being pulled to the left of the drawing when the cable is connected to the speedometer frame 26.

Due to the manufacturing tolerances between the dimensional size of the core tip 14 and the dimensional size of the rectangular driving recess 28 in the bore 16 of the magnetic shaft 22, a condition known as speedometer noise often occurs when the vehicle is moving. Additionally, speedometer noise can occur as a result of vibrations or sound waves being transmitted along the flexible shaft 10 from the transmission 12 to the speedometer 18. These vibrations are coupled from the shaft 10 to the speedometer frame 26 generating a noise level that is capable of being detected by a driver of the vehicle. In order to attenuate and, in fact, eliminate these sources of noise, there is positioned on the end of the core tip 14 adjacent to the thrust collar 32, a noise absorbing member 34. The relative position of the noise absorbing member 34 and the thrust collar 32 is diagrammatically illustrated in the exploded view of FIG. 2.

FIGS. 4 and 5 illustrate the configuration of the noise absorbing member 34 and particularly illustrates the thin wall 36 construction. In the preferred embodiment, the wall thickness or $D_1$ is less than one-tenth of the inside internal diameter $D_2$. The cross-sectional area of the internal diameter of the noise absorbing member 34 is substantially equal to the cross-sectional area of the core tip 14. Additionally, the fit between the core tip 14 with the noise absorbing member 32 affixed thereon and the bore 16 in the magnet shaft 22 is an interference fit.

As illustrated in FIG. 3, when the core tip 14 is coupled to the rectangular driving recess 28 of the magnet shaft 22, the noise absorbing member 34 encircles the core tip 14 and deforms to flow into the space between the core tip 14 and the inside diameter of the bore 16. However, as illustrated in FIG. 8, the inside diameter of the bore 16 may be enlarged so that the noise absorbing member 34 does not deform as it is positioned in the space between the core tip 14 and the wall of the bore. The diameter of the bore is essentially equal to the length of the cross-sectional diagonal of the core tip 14 plus twice the wall thickness $D_1$ of the noise absorbing member 34. As a result, the core tip 14 is positioned in axial alignment with the magnet shaft 22 of the speedometer 18. Depending upon the dimensional difference between the corresponding size of the core tip 14 and the bore 16 of the shaft, noise absorbing member 34 will deform by varying amount to position itself between the driving surfaces of the core tip 14 and the surface of the bore 16. The damping or deformable characteristic of the noise absorbing member 34 will cause any displaced material to bulge between the thrust collar 32 and the end of the cylindrical extension 26 of the speedometer frame. Again, as illustrated in FIG. 8, the enlarged bore 16 does not cause the noise absorbing member 34 to deform or displace.

FIG. 7 illustrates a cross-sectional view of the core tip 14 and the relationship of the driving surfaces of the core tip to the rectangular driving recess 28 in the magnet shaft 22. FIG. 6 is a cross-sectional view showing the axial alignment of the core tip 14 within the bore 16 of the magnet shaft 22 as accomplished by the noise absorbing member 34.

In the preferred embodiment the noise absorbing member 34 has a very low resilient characteristic which enables it to deform readily due to the compression forces within its environment. This is illustrated in FIG. 3. The material of the noise absorbing member 34 is an elastomeric plastic and is typically a polyurethane resin similar to that of a material supplied by the Budd Company and marketed under the trade name "Texin 591A." This material has a durometer value of 91 on the Shore "A" scale and the maximum acceptable durometer is 95.

As previously indicated, the noise absorbing member 34 functions to isolate any noise vibrations transmitted along the flexible shaft 10 or generated within the bore 16 of the magnet shaft 22 from being coupled to the frame 26 of the speedometer 18. This is accomplished by the material of the noise absorbing member 34 absorbing or dampening these vibrations. In addition, because the noise absorbing member 34 fills the space between the core tip 14 and the bore wall of the shaft 22 an essentially rigid or unified coupling is made preventing relative motion between the magnet shaft 22 and the flexible shaft 10. Further, the noise absorbing member 34 functions as a shock absorber between the thrust collar 32 and the end of the cylindrical extension 26 of the speedometer frame.

Another advantage of the sound absorbing member 34 is the ease of positioning it on the flexible shaft 10. As illustrated in FIG. 1 and described in the aforementioned connector patent, the driving cable may be quickly removed from the speedometer frame 26. Once removed, the sound absorbing member 34 is placed over the end of the core tip 14 and the driving cable is then snapped back on the speedometer 18. No special heating, spraying or bonding processes are required.

There has thus been described an improvement in speedometer systems whereby speedometer noise has been greatly attenuated or removed by means of the sound absorbing member 34.

What is claimed is:

1. In a motor vehicle speedometer drive arrangement including:
    a drive member having a rate of rotation responsive to the speed of the vehicle;
    a flexible shaft having one end thereof coupled to said drive member for transmitting the rotational motion of said drive member, the other end of said flexible shaft terminating in an elongated tip having a substantially rectangular cross section;
    a speedometer frame member having an extending tubular cylindrical section;
    an elongated magnet shaft journalled for rotation in the tubular cylindrical extension of said frame member having means at one end adapted for receiving the rectangular core tip of said other end of said flexible shaft;
    a magnet connected to the other end of said magnet shaft and rotatably driven by the rotational motion of said flexible shaft generating a magnetic field; and
    an indicating means responsive to said magnetic field for indicating the speed of the vehicle, the improvement comprising:
    a cylindrical tubular noise absorbing member encircling said core tip adapted to be compressively received in said one end of said magnet shaft, said member axially aligning said flexible shaft in said magnet shaft and having an inner diameter that is less than the cross-sectional diagonal dimension of the core tip, 2. In the motor vehicle speedometer drive arrangement according to claim 1 wherein said cylindrical tubular noise absorbing member is fabricated from a low resilient deformable elastomeric plastic material having a maximum durometer of 95.

3. In the motor vehicle speedometer drive arrangement according to claim 1 wherein said cylindrical tubular noise absorbing member is fabricated from a polyurethane resin material.

4. In the motor vehicle speedometer drive arrangement according to claim 1 wherein the cross-sectional area defined by the internal diameter of said cylindrical tubular noise absorbing member is substantially equal to the cross-sectional area of said core tip.

5. For a drive arrangement using a flexible drive cable driven at one end from a rotational source and having an elongated core tip at its other end which is of substantially rectangular cross section and is adapted to be received in a bore of a driven member having a substantially circular inlet portion and an intermediate drive portion of complimentary cross-sectional configuration to the said core tip of said drive cable;
    a cylindrical noise and impact absorbing member encircling said core tip and adapted to be compressively received in the said circular inlet portion of the bore of said driven member and having an inner diameter that is less than the cross-sectional diagonal dimension of the said core tip.

* * * * *

UNITED STATES PATENT OFFICE
CERTIFICATE OF CORRECTION

Patent No. 3,839,882          Dated  October 8, 1974

Inventor(s)   Casimir Silarski, Jr.

It is certified that error appears in the above-identified patent and that said Letters Patent are hereby corrected as shown below:

On the cover page, the inventor's name is incorrectly designated as "Gilarski, Jr." and should be --Silarski, Jr.-- and should be changed at column 1, [75] from "Casimir Gilarski, Jr." to --Casimir Silarski, Jr.--.

Signed and sealed this 28th day of January 1975.

(SEAL)
Attest:

McCOY M. GIBSON JR.
Attesting Officer

C. MARSHALL DANN
Commissioner of Patents